United States Patent [19]
Murakami et al.

[11] Patent Number: 6,065,065
[45] Date of Patent: May 16, 2000

[54] PARALLEL COMPUTER SYSTEM AND FILE PROCESSING METHOD USING MULTIPLE I/O NODES

[75] Inventors: Takeo Murakami; Naoya Fujisaki, both of Kawasaki, Japan

[73] Assignee: Fujitsu Limited, Kawasaki, Japan

[21] Appl. No.: 08/902,157

[22] Filed: Jul. 29, 1997

[30] Foreign Application Priority Data

Jan. 30, 1997 [JP] Japan .................................. 9-016196

[51] Int. Cl.[7] .................................................. G06F 15/16
[52] U.S. Cl. ........................................ 709/250; 709/219
[58] Field of Search ........................... 395/200.8, 200.49, 395/200.47, 200.53, 200.33; 709/250, 219, 217, 223, 203

[56] References Cited

U.S. PATENT DOCUMENTS

| | | | |
|---|---|---|---|
| 5,403,639 | 4/1995 | Belsan et al. | 707/204 |
| 5,649,200 | 7/1997 | Leblang et al. | 395/703 |
| 5,752,042 | 5/1998 | Cole et al. | 395/712 |
| 5,768,623 | 6/1998 | Judd et al. | 395/857 |
| 5,819,061 | 10/1998 | Glassen et al. | 395/406 |
| 5,857,197 | 1/1999 | Mullins | 707/103 |
| 5,862,325 | 1/1999 | Reed et al. | 395/200.31 |

OTHER PUBLICATIONS

Computer Architecture and Organization by John P. Hayes, pp. 61–71, 512–513, 1988.

*Primary Examiner*—Zarni Maung
*Attorney, Agent, or Firm*—Staas & Halsey LLP

[57] ABSTRACT

A parallel computer system comprises a plurality of calculation nodes and I/O nodes connected through a network. This parallel computer system comprises a plurality of secondary storage devices for storing, as partition files, divided data which correspond to a logical file processed on said calculation nodes. The plurality of secondary storage devices are connected to the I/O nodes, respectively. This parallel computer system further comprises a network file unit for relating the logical file with the partition files separately stored among said plurality of secondary storage devices. As the data corresponding to the logical file on the calculation nodes are separated and stored in the plurality of the secondary storage devices, the busy state in data input/output in the I/O nodes is resolved, thereby enabling a high-speed processing of a massive volume of data in the parallel computer system.

32 Claims, 18 Drawing Sheets

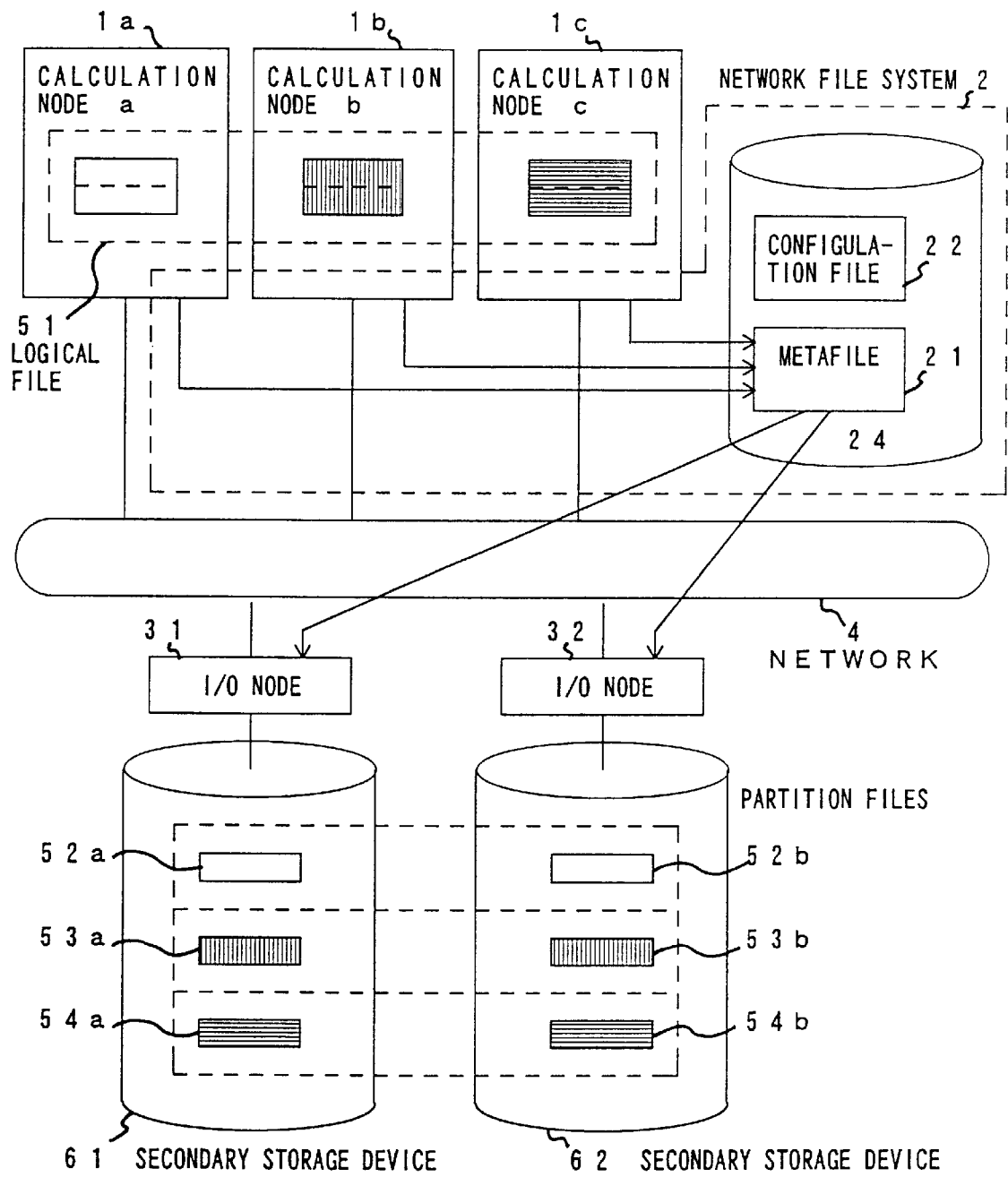
F I G. 1

METAFILE

| s p f s f i l e | |
|---|---|
| NUMBER OF STRIPE | STRIPE WIDTH |
| I/O NODE:PARTITION FILE NAME | |
| I/O NODE:PARTITION FILE NAME | |
| I/O NODE:PARTITION FILE NAME | |
| ⋮ (FOR THE NUMBER OF STRIPE) | |

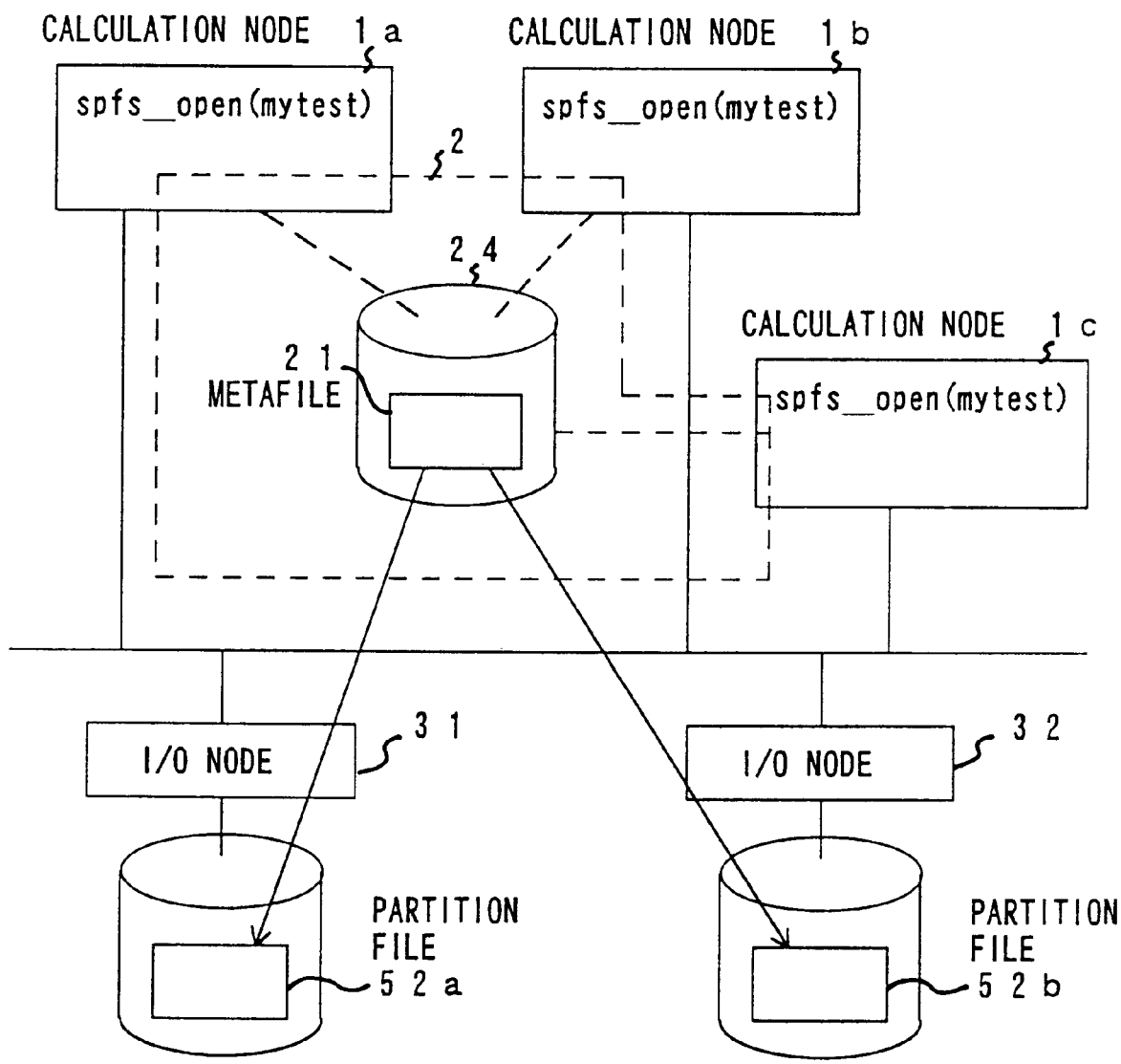
F I G. 3

DESIGNATION OF THE NUMBER OF STRIPE

```
err = spfs_open (filename, stripe_no, ··· ) ;
```

F I G. 4

DESIGNATION OF THE STRIPE WIDTH

```
err = spfs_open (filename, stripe_size, ··· );
```

F I G. 5

CONFIGURATION FILE

| I/O NODE NAME | FILE PREFIX NAME |
|---|---|
| I/O NODE NAME | FILE PREFIX NAME |
| I/O NODE NAME | FILE PREFIX NAME |
| ⋮ | |

FIG. 6

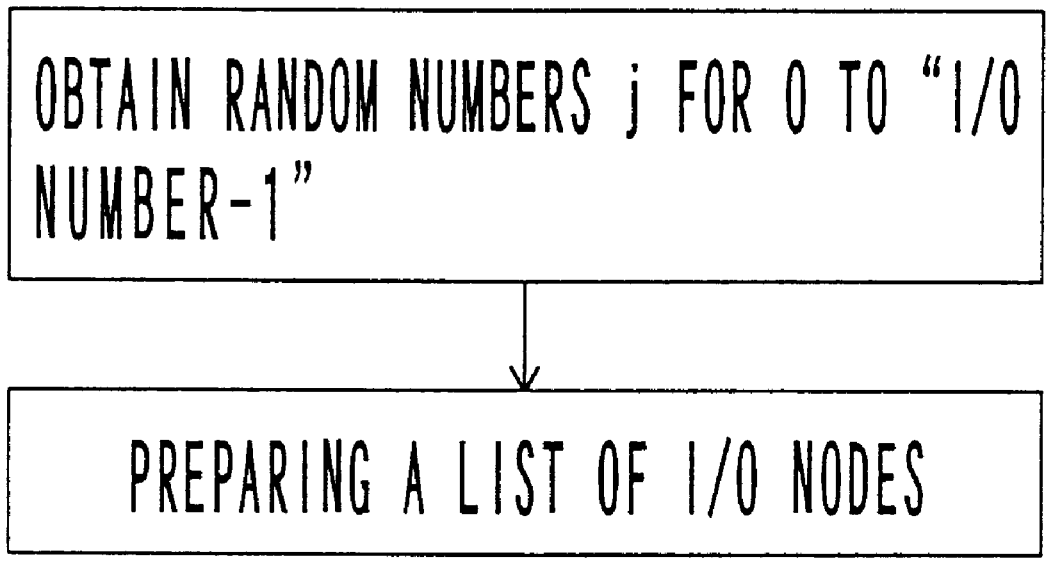
F I G. 7

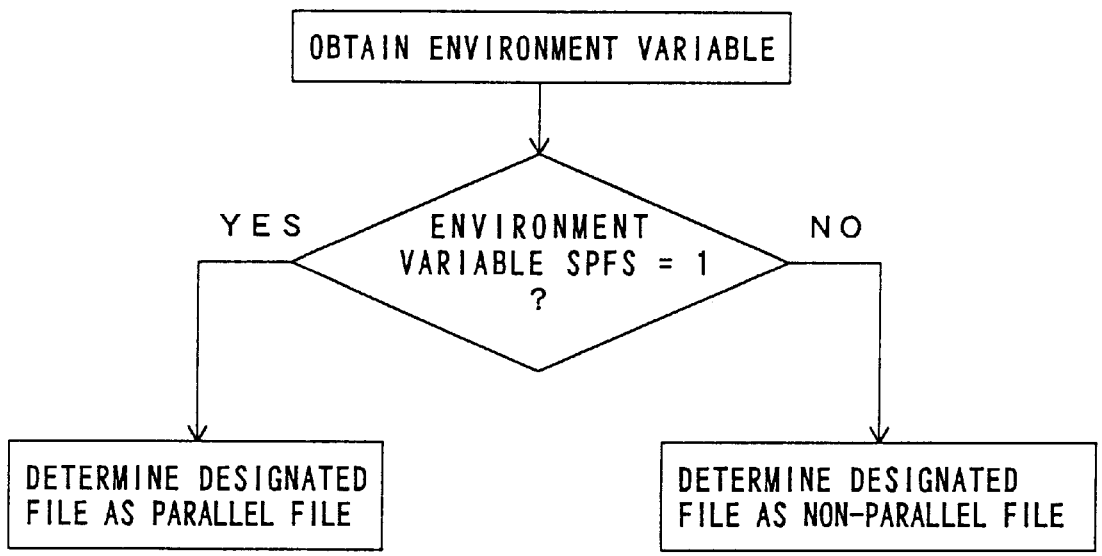
F I G. 9

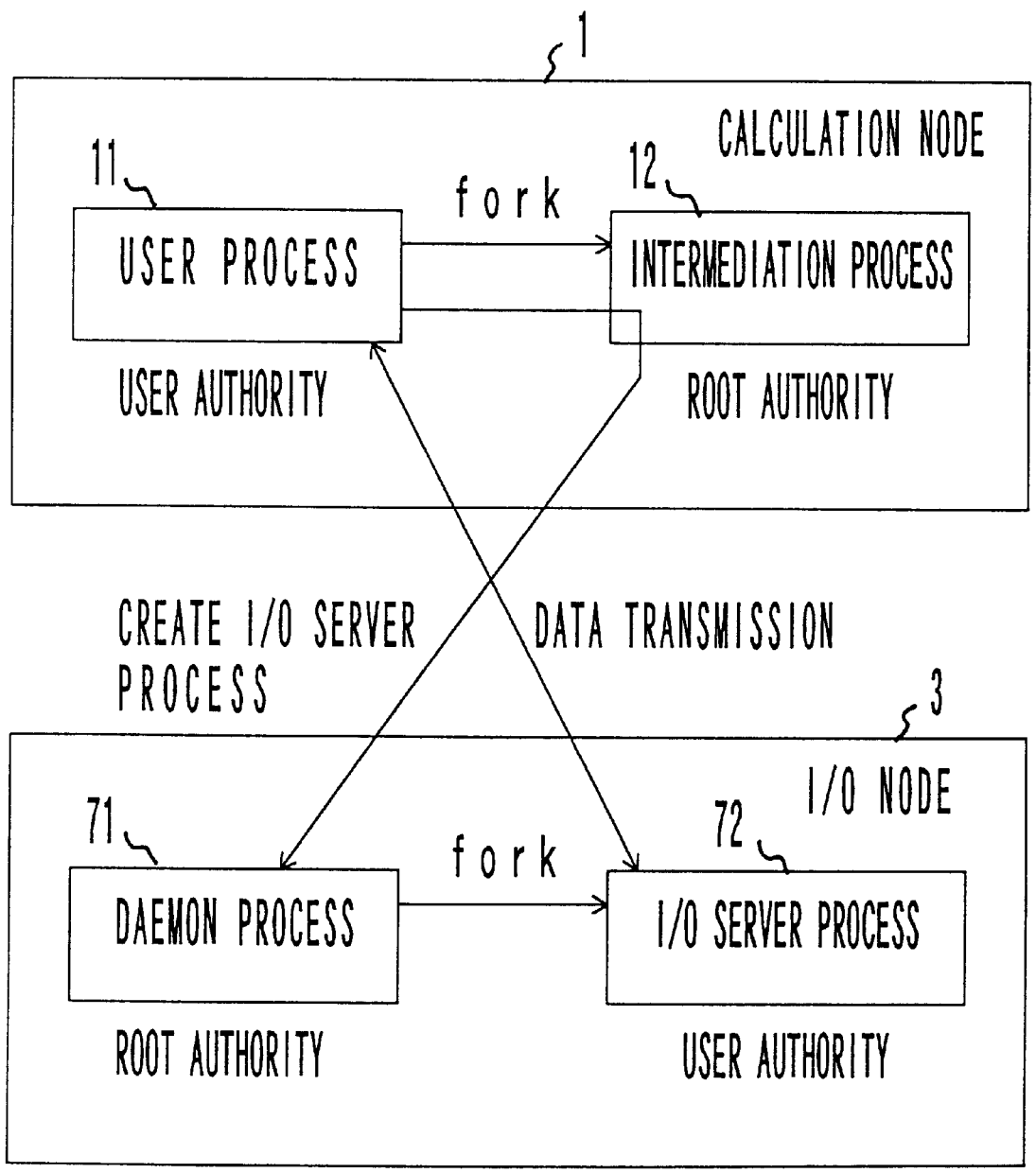
F I G. 1 1

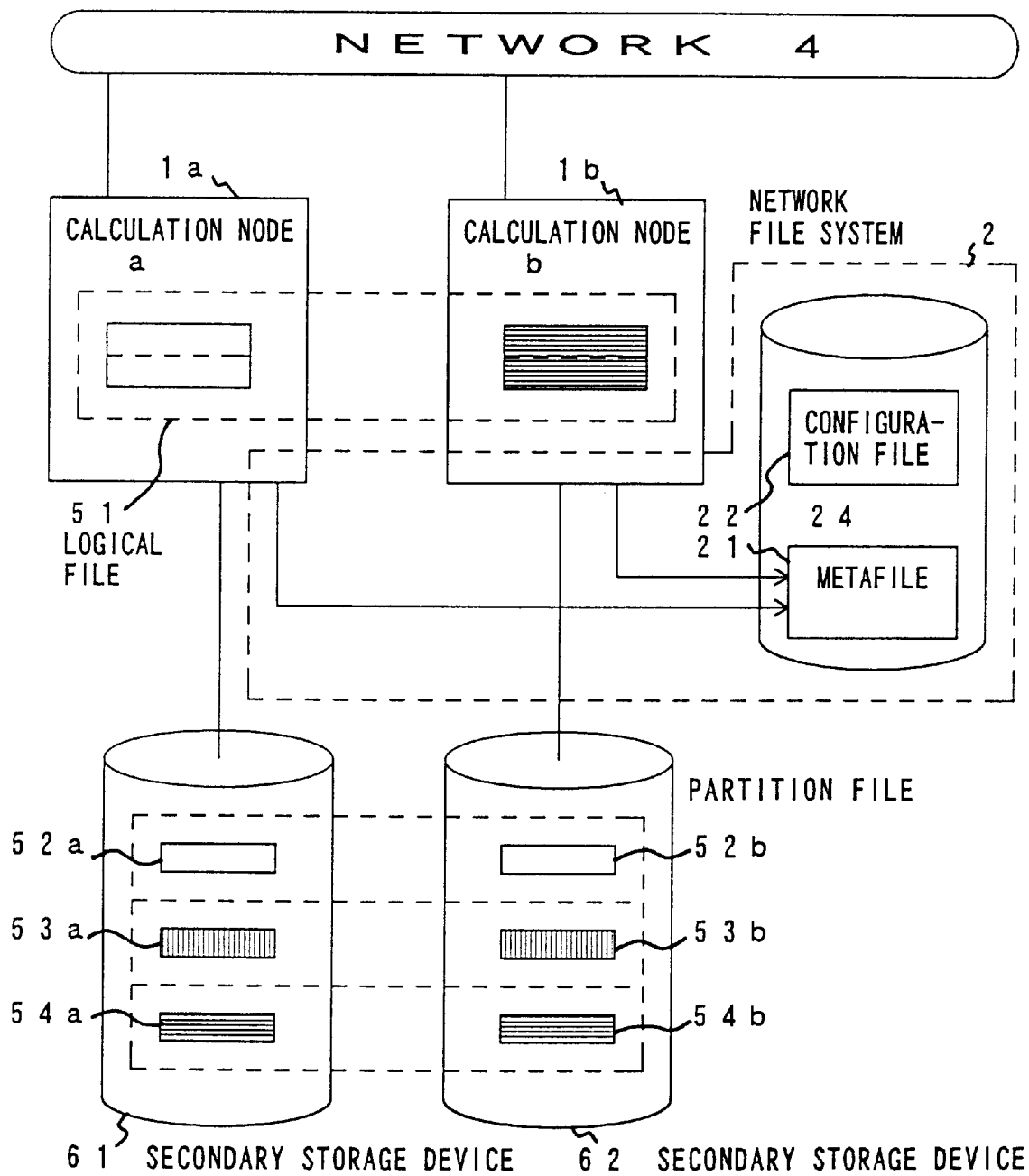
F I G. 1 6

PARALLEL COMPUTER SYSTEM AND FILE PROCESSING METHOD USING MULTIPLE I/O NODES

BACKGROUND OF THE INVENTION

1. Field of the Invention

The present invention relates to a parallel computer in which calculation nodes (data processing nodes) are connected through a network, and more specifically to a parallel computer including a file system for storing and processing a massive volume of data.

2. Description of the Related Art

In recent years, the need for computer systems enabling high-speed processing of high-volume data is increasing, especially in the field of science technology calculation. In a parallel computer, the data processing time has been shortened by parallelized programs according to a developed parallel processing technique.

However, when high-volume data for programs performed in the parallel computer are input to and output from a storage device, the input and output of the data cause a bottleneck for the whole process in the parallel computer. Therefore, a high-speed technique for the data input/output processing becomes important in order to get the best performance from the programs.

In a conventional parallel computer system, a single disk storage device or a plurality of disk storage devices are connected to a node or a computer for inputting and outputting data (herein after referred to as an I/O node), which is used as a file server.

The I/O node receives a file input/output request from another node so as to input data to or output data from a disk storage device, and sends the process result to the node which issued the request. However, because the communication capacity, the power of the CPU, and the ability to input and output data of one I/O node have their limits, the performance of the I/O node decreases when a file input/output request for a high volume of data is issued by a node or a large number of file input/output requests are simultaneously sent from a plurality of nodes.

Accordingly, the conventional parallel computer system has a problem in that system performance is reduced by the bottleneck of data input/output in the I/O node, especially when a plurality of application programs which require mass data processing are performed simultaneously in the parallel computer system.

SUMMARY OF THE INVENTION

In view of the foregoing, the present invention aims to reduce the burden on an I/O node even when a high volume of data are processed in the parallel computer, and to realize an efficient operation of the parallel computer system, in which data input/output processes in the I/O nodes are improved.

A parallel computer system according to the invention comprises: a calculation node (data processing node, or computing node) connected to a network; a plurality of storage devices (secondary storage devices) for storing, as partition files, divided data which correspond to a logical file processed in the calculation node; and a network file portion for relating the logical file with the partition files separately stored among the plurality of storage devices, each of which is connected to the network through an I/O node (input/output node).

A file processing method according to the invention is for a parallel computer system which comprises a plurality of nodes connected through a network. This file processing method comprises the steps of: storing divided data, which correspond to a logical file processed in a calculation node connected to the network, in a plurality of storage devices as partition files; and preparing a metafile for relating the logical file with the partition files which are separately stored among the plurality of storage devices.

A storage medium according to the invention is a medium readable by a computer holding a program executable by the computer to perform the above described file processing method, and which may be implemented by an optical medium, a magnetic medium, and a magneto-optic medium, and may include such as a floppy disk, a hard disk, a CD-ROM, MD or the like.

BRIEF DESCRIPTION OF THE DRAWINGS

FIG. 1 shows a configuration of a first embodiment of a parallel computer system according to the invention;

FIG. 3 shows a referring process to the metafile according to the invention;

FIG. 4 shows a designation of the number of the stripe of a partition file according to the invention;

FIG. 5 shows a designation of the stripe width of a partition file according to the invention;

FIG. 6 shows a configuration of a configuration file according to the invention;

FIG. 7 shows a process for the determination of an I/O node for a partition file according to the invention;

FIG. 9 shows a process for identification of a parallel file according to the invention;

FIG. 11 shows a check of an access right for a logical file according to the invention;

FIG. 16 shows a configuration of a second embodiment of a parallel computer system according to the present invention;

DESCRIPTION OF THE PREFERRED EMBODIMENT

Figures 2A, 2B:
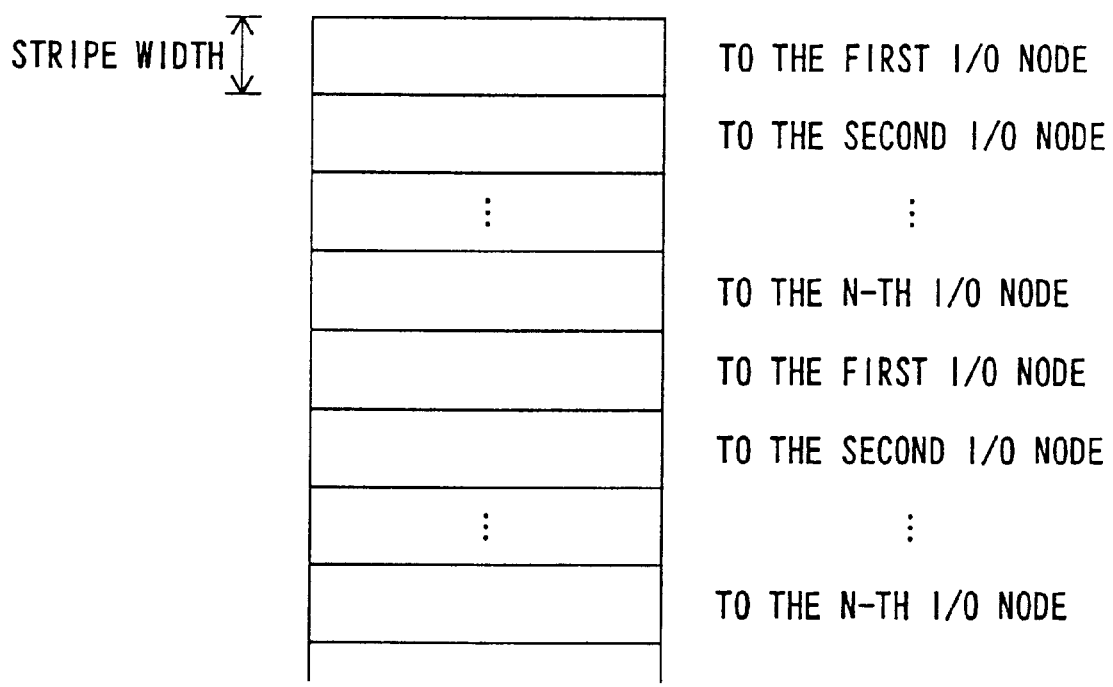
FIG. 2A shows a configuration of a metafile according to the invention.
FIG. 2B shows an example of a partitioning of a logical file according to the invention.

FIG. 1 shows a configuration of a parallel computer system according to a first embodiment of this invention.

The parallel computer system comprises; calculation nodes (data processing nodes or computing nodes) 1a, 1b, and 1c, each includes a CPU and a main memory or storage device; a network file system 2 for providing a file access function common to the calculation nodes 1a, 1b, and 1c; I/O nodes 31 and 32; secondary storage devices 61 and 62 connected to the I/O nodes 31 and 32, respectively; and a network 4 to which the calculation nodes 1a, 1b, and 1c and the I/O nodes 31 and 32 are connected. The network file system 2 comprises a metafile 21 indicating a logical file 51 which is processed in common in the calculation nodes 1a, 1b, and 1c, and a configuration file 22 including a list of I/O nodes, which indicates I/O nodes 31 and 32 corresponding to the secondary storage devices 61 and 62 holding actual data or files of the logical file 51. The I/O nodes 31 and 32 are used for inputting data to and outputting data from the secondary storage devices 61 and 62, respectively. The actual data which correspond to the logical file 51 are divided and stored in the secondary storage devices 61 and 62 as partition files 52a, 52b, 53a, 53b, 54a, and 54b, as shown in FIG. 1. The secondary storage devices 61 and 62, which may be implemented by, for example, magnetic disk devices, are for holding mass data or high-volume data.

For attaining high-speed data input/output, I/O nodes 31 and 32 and calculation nodes 1a, 1b, and 1c are configured as different units. However, calculation nodes 1a, 1b, and 1c can include the functions of the I/O nodes 61 and 62. The calculation nodes 1a, 1b, and 1c which uses the logical file 51 for their processing, request the input and output of the data stored in the secondary storage devices 61 and 62 to the I/O nodes 31 and 32 through the network 4 using the function provided by the network file system 2. The network file system 2 can be realized by the functions of the calculation nodes 1a, 1b, and 1c and a secondary storage device which holds the metafile 21 and the configuration file 22.

A file which used to be stored in a single secondary storage device in a conventional computer system is divided into the plurality of partition files 52a–54a and 52b–54b and stored in the plurality of storage devices 61 and 62, according to this embodiment. Therefore, each of the data input/output processes of the I/O nodes 31 and 32 can be performed simultaneously in parallel, thereby improving the file input/output performance of the parallel computer system.

The calculation nodes 1a, 1b, and 1c access the partition files 52a–54a and 52b–54b by referring to the metafile 21, through which the logical file 51 and the partition files 52a–54a and 52b–54b are linked. Thus, the logical file 51 can be used in, for example, an application program on the calculation nodes 1a, 1b, and 1c, as if the files corresponding to the logical file 51 are configured as a single file and not a plurality of files.

The metafile 21 and the configuration file 22 are prepared in a secondary storage device 24 accessible from all of the calculation nodes 1a, 1b, and 1c. Therefore, a logical file (parallel file) created in one calculation node can be used by another calculation node.

When the logical file 51 is created, the number of partitions of the partition files 52a–54a and 52b–54b separately stored among the storage devices 61 and 61 is designated in the metafile 21, and the data length or the stripe width of the partition files 52a–54a and 52b–54b is also designated in the metafile 21. Using this function, designers, users, and managers of an application program performed on the parallel computer system can set the appropriate stripe number and stripe width for each file in consideration of the file size and the characteristics of the application program.

The configuration file 22, including a list of I/O nodes through which data or files corresponding to the logical file 51 are stored, is prepared in the secondary storage device 24. When the logical file 51 is created, I/O nodes to be accessed are selected from the list in the configuration file 22 at random. As a result, I/O nodes used for parallel files (logical files) vary for each parallel file, thereby avoiding the congestion of a certain I/O node.

File names of the partition files 52a–54a and 52b–54b are determined to be a name including a site name of the calculation node and a process ID, time, and sequence information of the process in the calculation node. If the file names are determined using random numbers, partition files of different logical files may have the same file name. However, according to the invention, duplication of a file name can be avoided.

The calculation nodes 1a, 1b, and 1c can select one of two methods of processing a parallel file of the logical file 51 and a normal physical file (non-parallel file). Therefore, this parallel computer can use the same program for both parallel files and non-parallel files, thereby avoiding a change of the program.

When the logical file 51 (parallel file) is open, only one of the calculation nodes 1a, 1b, and 1c (master node) can perform a communication to the I/O nodes 31 and 32 connected to the secondary storage devices 61 and 62 holding the actual data, and other calculation nodes processing the same logical file (slave nodes) can receive the communication result from the master node. This reduces the amount of communication between the calculation nodes 1a, 1b, and 1c and the I/O nodes 31 and 32, and improves the whole system performance.

FIG. 2A shows a configuration of the metafile 21.

The metafile 21 includes identifying information showing a logical file (spfsfile), the number of stripes which indicates the number of stripes (split number) of the partition files, the stripe width showing the data length of the divided data, the names of the I/O nodes, and the names of the partition files 52a–54a and 52b–54b in relation to the names of I/O nodes, as shown in FIG. 2A. The "spfs" of "spfsfile" is an abbreviation for "Scalable and Parallel File System".

FIG. 2B shows an example of a partitioning of the logical file 51 according to the invention.

A volume of data corresponding to the designated stripe width is assigned as a partition file to each of the I/O nodes from the first to N-th I/O node, which correspond to the I/O nodes 31 and 32 in FIG. 1, as shown in FIG. 2B.

FIG. 3 shows a referring process to the metafile 21 according to the invention, in which a metafile named as "mytest" is referred to by the calculation nodes 1a, 1b, and 1c in order to access the partition files 52a and 52b, as an example. The secondary storage device 24 which holds the metafile 21 can be accessed from all of the calculation nodes 1a, 1b, and 1c. The name "mytest" of the metafile 21 is substantially the same as the name of the logical file used in the calculation nodes 1a, 1b, and 1c. The actual data corresponding to the logical file is divided according to the designated number of stripes and the stripe width, and stored as partitioned files 52a and 52b.

FIG. 4 shows an example of a command description used when an application program which operates in the calculation nodes designates the number of stripes (split number) at the time of creating a logical file (parallel file). The name "filename" and the number of stripes "stripe_no" of the logical file to be created are designated in a function "spfs_open", as shown in FIG. 4, and the network file system 2 creates the partition files 52a–54a and 52b–54b according to the number of stripes designated. In this case, a value indicating the result of the process is reflected in the variable "err".

FIG. 5 shows an example of a command description used when the application program designates the stripe width (data length for the split) at the time of creating the logical file. The name "filename" and the width of stripes "stripe_size" of the logical file to be created are designated in a function "spfs_open", as shown in FIG. 5, and the network file system 2 divides the file according to the stripe width designated. A value indicating the result of the process is reflected to the variable "err".

FIG. 6 shows a configuration of the configuration file 22.

The system manager prepares the configuration file 22 in a directory designated in advance. The list of I/O nodes to which the partition files are stored and the prefix names of the partition files are designated in the configuration file 22, as shown in FIG. 6. I/O nodes through which the partition files are created are determined by reference to the configuration file 22 in the network file system 2. The configuration file 22 is prepared using a specific name which is predetermined for only one file in the whole system.

FIG. 7 shows a process for the determination of the I/O node for partition files.

When a command for creating the logical file 51 is issued in an application program performing in the calculation nodes 1a–1c, the network file system 2 refers to the configuration file 22 to obtain the number of the I/O nodes and calculates random numbers j, for 0 to the number of I/O nodes minus 1. Then the list of I/O nodes to be used for preparing the partition files is determined by selecting I/O nodes for the number of the stripes (stripe_no) from an entry (j-th entry) in the configuration file 22.

Figure 8:
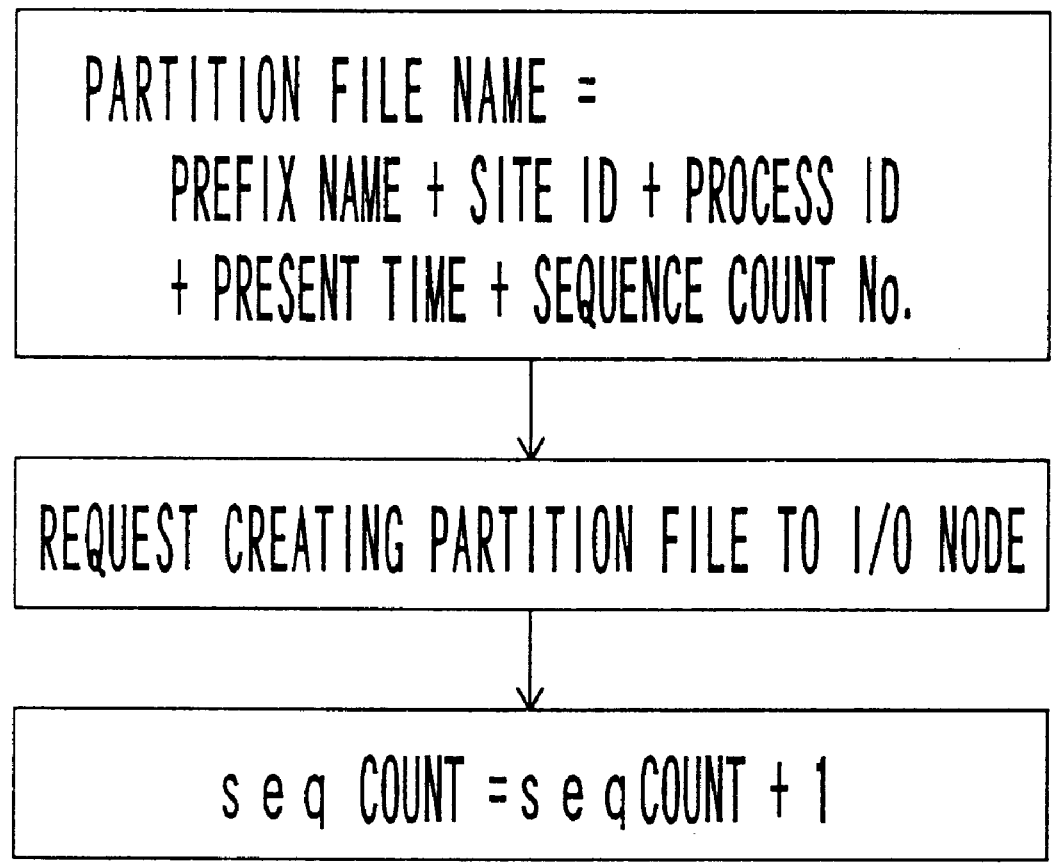
FIG. 8 shows a process for the determination of a file name for a partition file according to the invention.

FIG. 8 shows a process for the determination of a file name for partition files.

When a command for creating the logical file 51 is issued in an application program performing on the calculation nodes 1a–1c, the network file system 2 creates the partition files on the I/O nodes 31 and 32. Each of the file names of the partition files is automatically created by the network file system 2, wherein the file name is determined using a prefix name of the file written in the configuration file 22 described by a system manager, a site ID of the calculation node, a process ID, the present time, and the sequence count number, in this order. The site ID is the identifier which is predetermined and specified for each device of the node. The sequence count starts from 0 and is incremented by 1 for each partition file created.

FIG. 9 shows a process for identification of the parallel file.

Before the execution of the program for the file processing, the program user sets a specified environment variable, which is "SPFS" in this embodiment; "yes" (the value=1) or "no" (the value=0). If a process command for a parallel file exists in the program, the network file system 2 checks the environment variable (SPFS), and determines that the file to be processed is a parallel file composed of a plurality of partition files so as to perform a process for the parallel file if the environment variable is "yes". If the environment variable is "no", the network file system 2 determines that the file to be processed is a non-parallel file so as to perform a suitable process for the non-parallel file.

Figure 10:
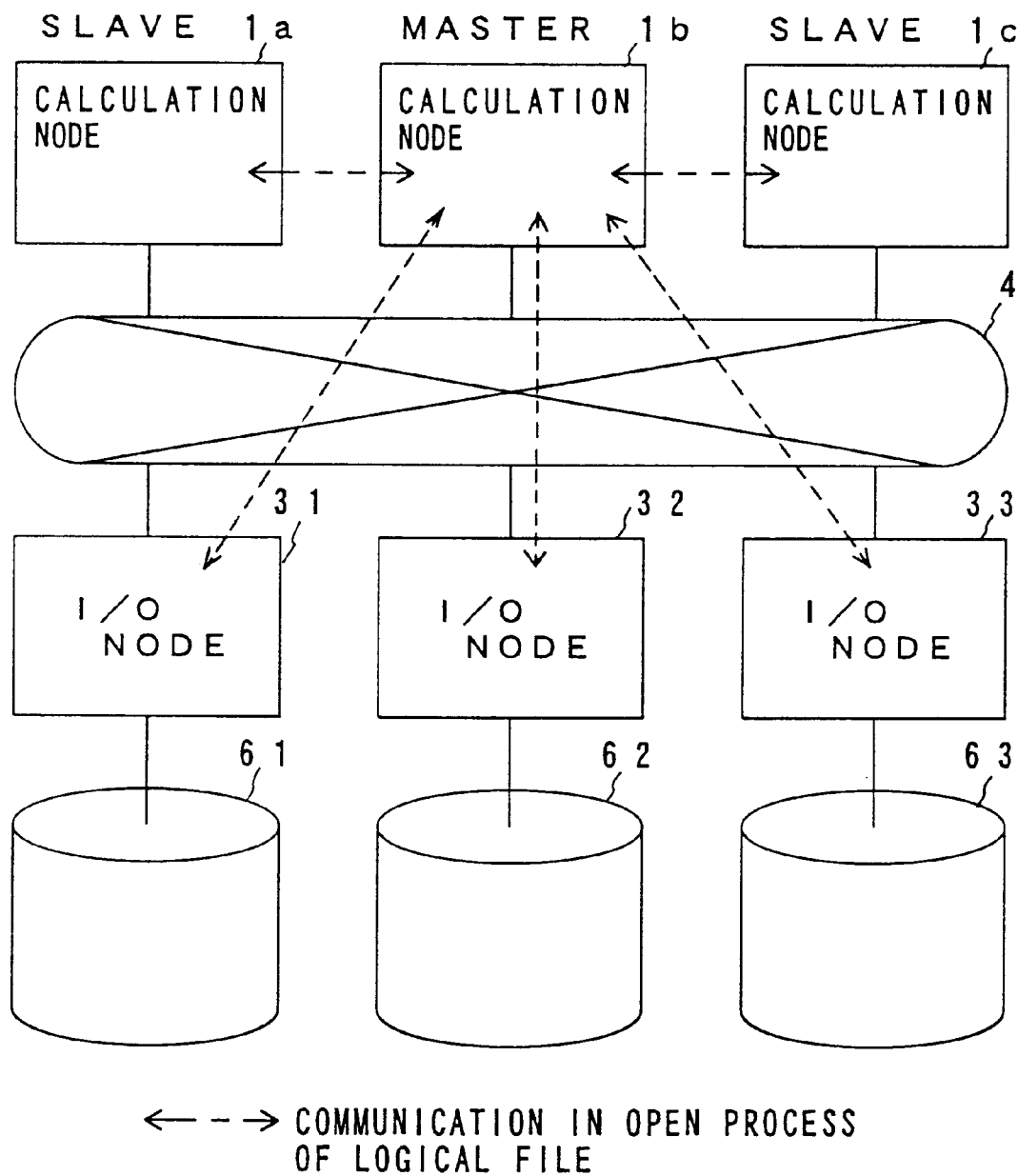
FIG. 10 shows a communication in an open process of a logical file according to the invention.

FIG. 10 shows a communication in an open process of a logical file in a parallel computer system comprising three I/O nodes 31, 32, and 33.

In a parallel program which performs in the calculation nodes 1a–1c, when a file is to be shared in a plurality of processes in the calculation nodes, the open commands may be issued simultaneously in the plurality of processes in the calculation nodes. Then, the network file system 2, which is omitted in FIG. 10, synchronizes the plurality of processes which issue the open command, and only a master process in a certain calculation node, which is the calculation node 1b in this embodiment, sends a message for the open process to the I/O nodes 31, 32, and 33, having the corresponding files.

Receiving the message from the master process in the calculation node 1b, each of the I/O nodes 31, 32, and 33 performs the open process of the corresponding partition file and sends the result to the master process in the calculation node 1b. Then, the master process informs the processes in the other calculation nodes 1a and 1c (slave processes) of the result. As only the master process in one calculation node communicates to the corresponding I/O nodes, the amount of communication between the calculation nodes 1a–1c and the I/O nodes 31–33 decreases, thereby improving the performance of the whole system.

FIG. 11 shows a check mechanism of an access right for the logical file.

A daemon process 71 is prepared on each I/O node as a resident process performed under root authority, as shown in FIG. 11. A user process 11 in the master process creates an intermediation process 12 on a calculation node 1 by, for example, a "fork" command, which is used for the UNIX system at the time of the opening of the logical file (parallel file).

A "setuid" bit is set in the intermediation process 21 which is performed upon root authority, which means the privilege of root for executing a process. The intermediation process 12 sends a creation request (start request) for an I/O server process 72 to the daemon process 71 in an I/O node 3 through a privilege port. The data transmitted to the daemon process 71 are the port number which is used by the user process 11 and sent from the user process 11, a user identifier (uid), and a group identifier (gid).

The daemon process 71 disregards a creation request for the I/O server process 71 if the request is sent from a general port. When the request is sent from a privilege port, the daemon process 71 starts the I/O server process 72 corresponding to a designated user identifier by, for example, a "fork" command, and sends the port number of the I/O sever process 72 to the user process 11 through the intermediation process 12. After that, the user process 11 communicates with the I/O server process using the port that the user process 11 notified to the intermediation process 12.

The I/O server process 72 disregards a request for an input/output process if the request is sent from an address (site ID and port number) which is not registered, and accepts the request from a registered address, which means an address of user process 11 including the master process and the slave process received from the daemon process 71 at the time of starting of the I/O server process 72.

According to this mechanism, a user who has no right of accessing files cannot access any files even if the user sends a falsified address or information to the I/O server process 72.

Figure 12:
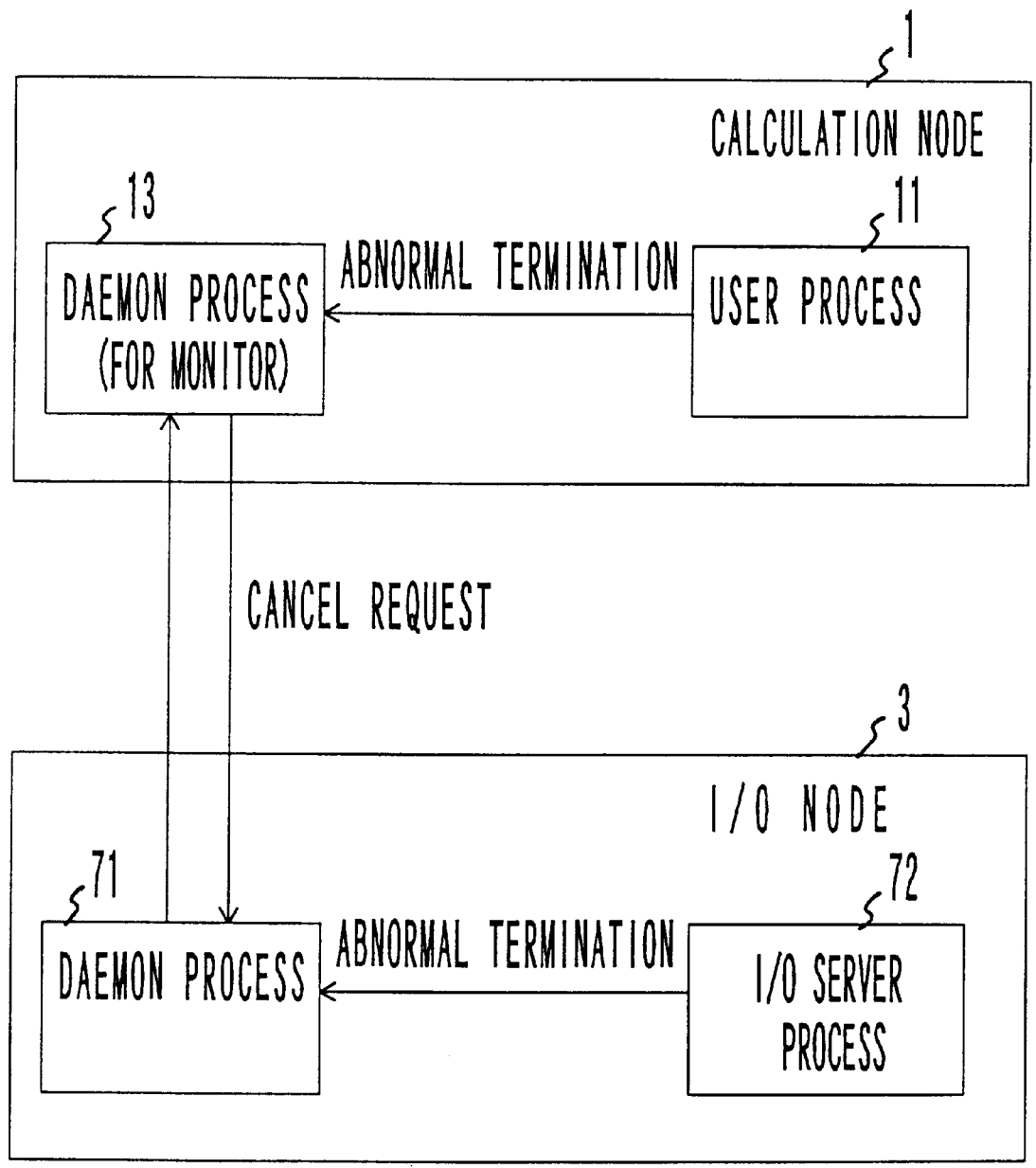
FIG. 12 shows a forced termination of an I/O server process after an abnormal termination of a user process according to the invention.

FIG. 12 shows a mechanism of a forced termination of the I/O server process at the time of an abnormal termination of the user process.

When the user process 11 opens a parallel file, a connection is established between the user process 11 and a daemon process for monitoring in the calculation node 1. When the parallel file is closed, the user process 11 sends information about a normal termination to the daemon process 13 and the connection is released. If the user process 11 terminates the parallel file without closing the file, the request for canceling the I/O server process 72 is sent to the daemon process 71 on the I/O node 3. Then, the daemon process 71 forcefully terminates the I/O server process 72 if the I/O server process 72 is still working.

According to this mechanism, if an abnormal termination arises in the operation of the user process for the parallel file, the corresponding I/O server process can be terminated. In a computer system without this mechanism, a waste I/O server process never terminates and the load on the I/O node increases, thereby reducing the performance of the system.

Figure 13:
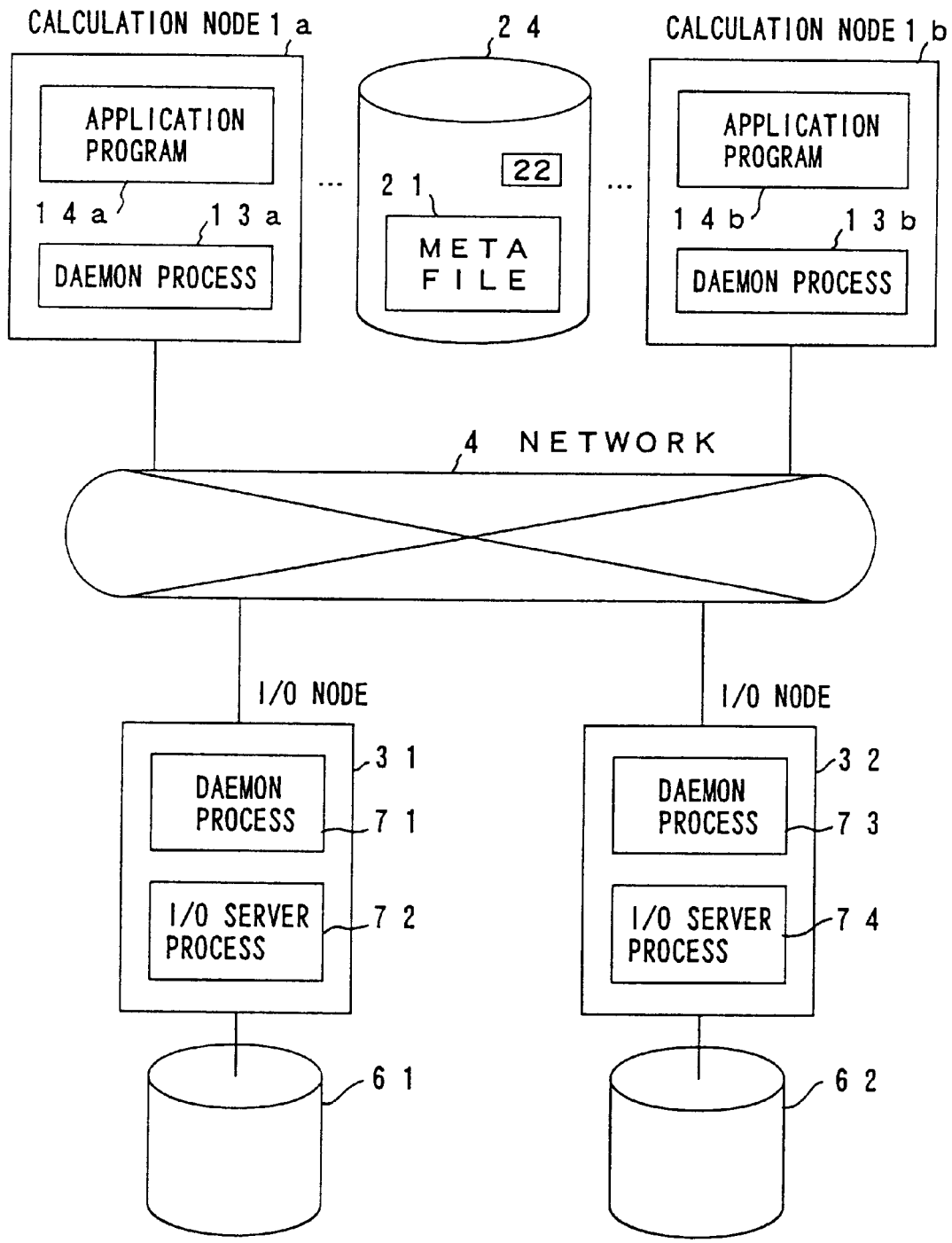
FIG. 13 shows a process configuration of the parallel computer system according to the invention.

FIG. 13 shows a process configuration of the parallel computer system according to the embodiment.

In this parallel computer system, the application programs 14a and 14b are executed by the calculation nodes 1a and 1b, and the file output/input process requested from the calculation nodes 1a and 1b is performed by the I/O nodes 31 and 32. The calculation nodes 1a and 1b share the secondary storage device 24 in which the metafile 21 for the parallel file is stored. The secondary storage devices 61 and 62 in which the partition files of the parallel files are stored are connected to the I/O nodes 31 and 32, respectively.

A predetermined file I/O library, which is omitted in the figure, is linked to the application program 14a and 14b. Daemon process 13a, 13b, 71, and 73 are always set in the calculation nodes 1a and 1b and the I/O nodes 31 and 32, respectively. The I/O server process 72 and 74 are created when the parallel file is opened, and disappear when the parallel file is closed.

Figure 14:
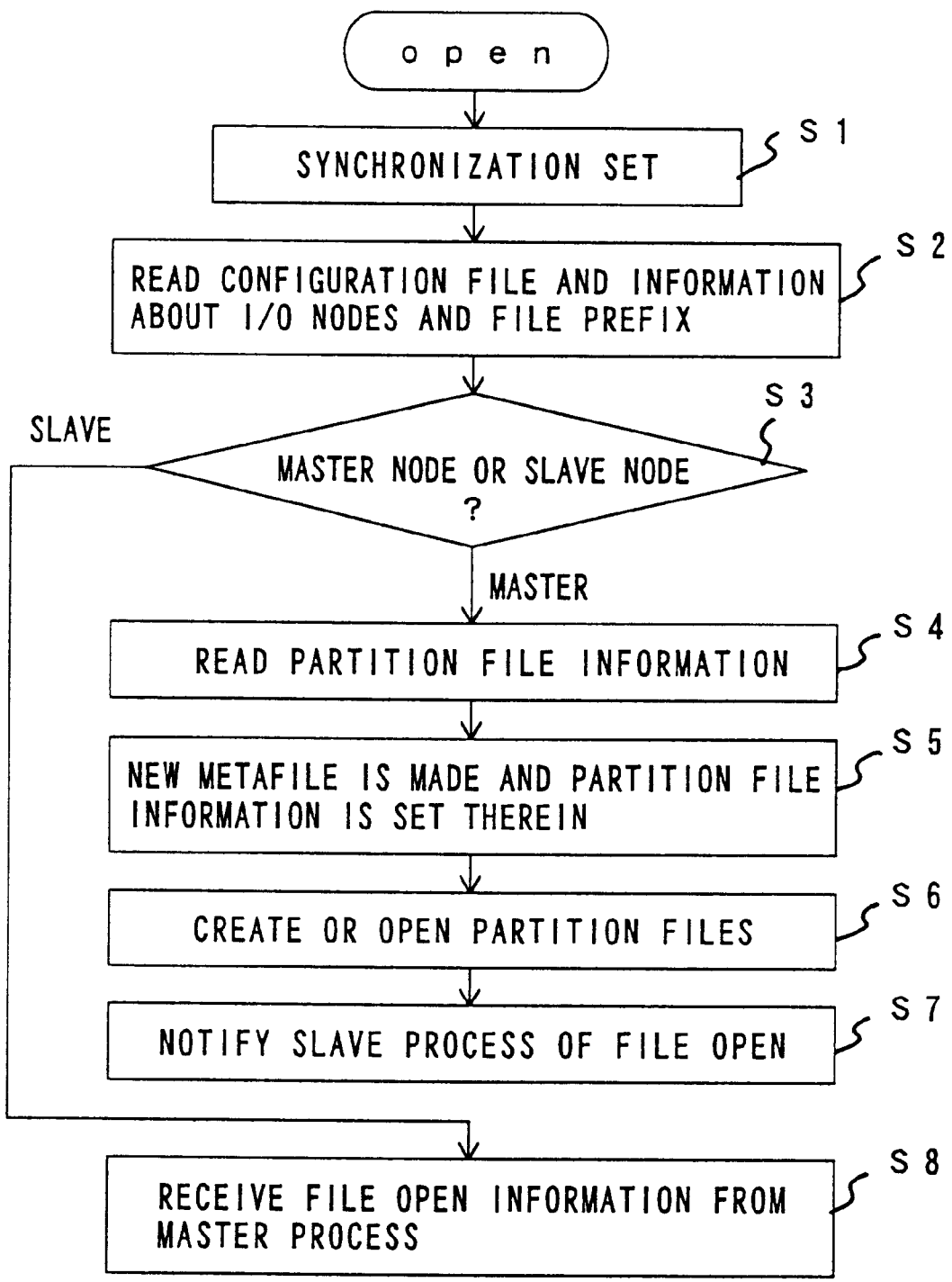
FIG. 14 is a flowchart showing processes on a calculation node at the opening of a parallel file according to the invention.

FIG. 14 is a flowchart showing processes on a calculation node at the opening of the parallel file (open process). This open process is included in the application program executed on the calculation node.

When the open operation of the parallel file is started, synchronization with the other processes which are concurrently opened is set in step S1. Next, the calculation node reads the configuration file 22 to obtain information about the I/O nodes and a file prefix in step S2. Then, a determination whether the node is a master or slave node is made in step S3.

If its node is determined as the master node (Master in step S3), whether or not a metafile 21 corresponding to the designated name (logical file name) already exists is checked, and information about the partition files is read from the metafile 21 in step S4 if the designated name exists. If the metafile of the designated name does not exist and a creation of the metafile is requested by the command "create", a new metafile 21 is made and information about the partition files are prepared in the new metafile 21, in step S5.

In step S6, communication is made with the I/O nodes 31 and 32 determined according to the configuration file 22. Here, if "create" is designated, partition files are created on the I/O nodes 31 and 32. If the partition files still exist, all of the partition files are opened. After that, information indicating that the partition files have been opened is notified to the slave process in the slave node, in step S7. The slave node, which is determined in step S3 (Slave in step S3), receives the information from the master process in the master node, in step S8.

In the process in step S6, the daemon processes 71 and 73 in the I/O nodes 31 and 32 receive a message of an open request from the master calculation node 1a or 1b, and create the I/O server processes 72 and 74 after checking the validity of the message to perform the open process for the partition files.

Figure 15:
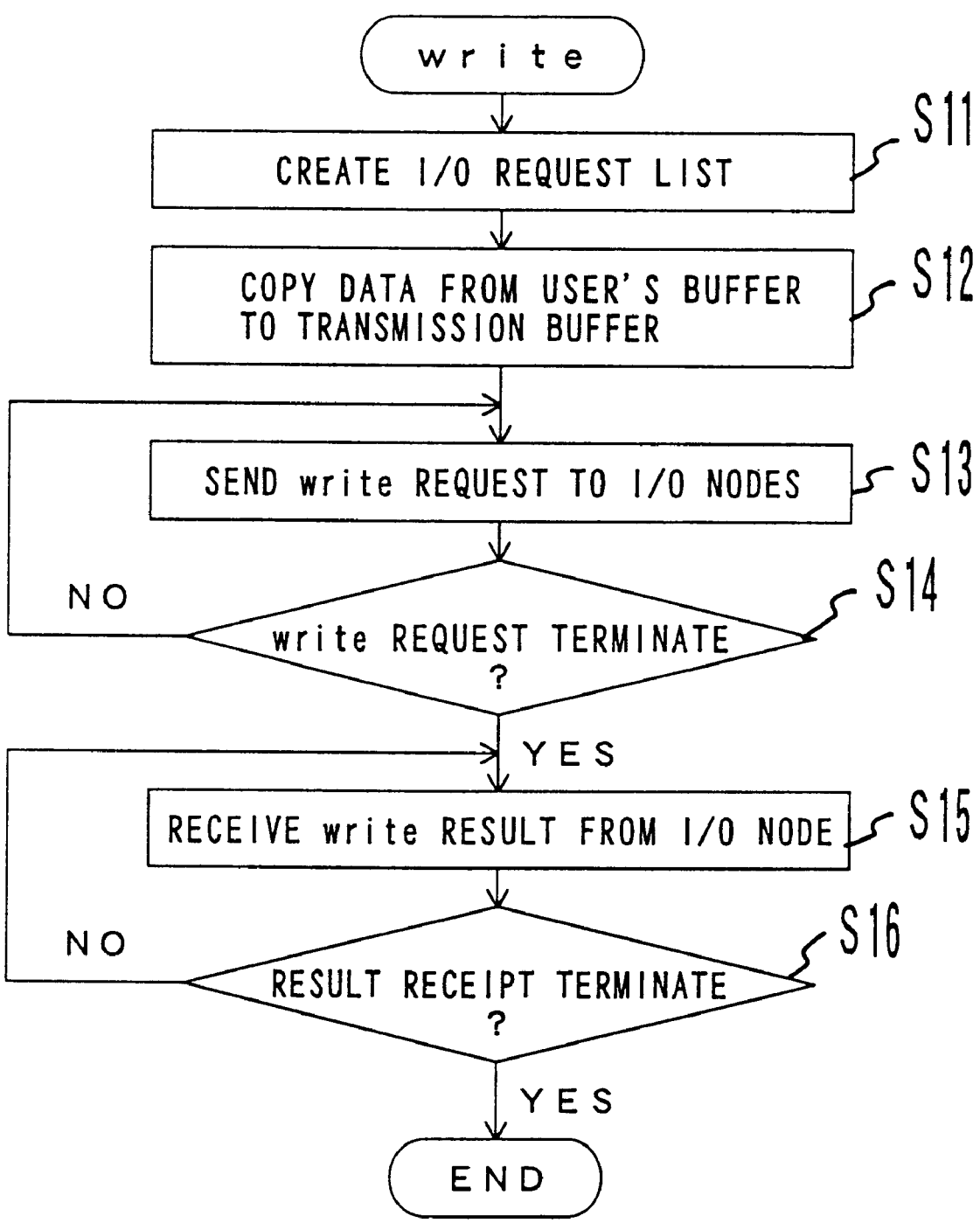
FIG. 15 is a flowchart showing processes in a calculation node at a time of writing of a parallel file according to the invention.

FIG. 15 is a flowchart showing processes in the calculation node for the writing process (write process) of the parallel file. The write process is included in the application program executed on the calculation node.

The calculation node determines which partition file fits the data requested to be written according to the file offset and data length for writing requested by the user, and creates an I/O request list for the corresponding partition files, in step S11. Next, the data in a user's buffer are copied to a transmission buffer managed by the network file system 2 for each partition file, in step 12. After that, a write request is sent to each I/O node on which the corresponding partition file exists, in step S13. If a plurality of I/O nodes are designated, the write request is sent to all of the plurality of I/O nodes, in steps S13 and S14.

Next, the calculation node receives the result of the writing from each I/O node, in step S15. If the write request is sent to a plurality of I/O nodes, the calculation node receives the results from all of the plurality of I/O nodes, in steps S15 and S16. The write process is terminated after receiving all the results.

As the read process for the parallel file is similar to the above write process, the explanation is omitted here.

The specifications of functions, which are provided as a file I/O library by the network file system 2 in the process for the parallel file, will now be described.

The open function is defined, in, for example, the C language, as follows:

int spfs_open (const char *filename, int flag, mode_t mode, int ionno, long stripe_size, ... )

The "filename" in this description of the function indicates a file name. The "flag" indicate a flag, for which the following information can be designated.

SPFS_RDWR: read/write
SPFS_RDONLY: reading only
SPFS_WRONLY: writing only
SPFS_CREAT: create file
SPFS_TRUNC: the size is set to be zero when an already-existing file is opened by read/write or write only The "mode" in the function indicates an access mode, for which the following information can be designated.

SPFS_IRUSR: the owner can read
SPFS_IWUSR: the owner can write
SPFS_IRGRP: a member of the owner group can read
SPFS_IWGRP: a member of the owner group can write
SPFS_IROTH: everyone can read
SPFS_IWOTH: everyone can write The "ionno" and "stripe_size" in the function indicate the designation of the stripe number of devices and the stripe width, respectively. The process number in a process group and a list of the process identifiers can be designated.

As the output for the open function, file handling information is returned. If an error occurs, "−1" is returned. The access mode, the stripe number of device, and the stripe width in the input information are disregarded if an already-existing file is opened.

The close function is defined as follows;

int spfs_close(int fh)

The "fh" in the description of the function indicates a file handle notified in the open process. As the output of the function, "0" is returned for a normal termination and "−1" is returned when an error occurs. All processes which issued an open command must issue a close command.

The write function is defined as follows;

int spfs_write (int fh, char *buf, size_t size)

wherein, the "fh", "buf", and "size" indicate the file handle, buffer, and transmission length, respectively.

The output of the write function is the transmission length of the actually written data, and "−1" is returned if an error occurs. Then, the file pointer is advanced for the transmission length of the actually written data.

The read function is defined as follows;

int spfs_read(int fh, void *buf, size_t size)

wherein, the "fh", "buf", and "size" indicate the file handle, buffer, and transmission length, respectively.

The output of the read function is the transmission length of the actually read data, and "1" is returned if an error occurs. The hole is handled according to the standard UNIX system. The file pointer is advanced for the transmission length of the actually read data.

The seek function is defined as follows;

int spfs_seek(int fh, long long offset, int whence)

wherein, the "fh" and "offset" indicate the file handle and the offset value, respectively. A file of more than 2G bytes is available by this designation of the offset.

The following information can be designated for the "whence".

SPFS_SEEK_SET: seek from the start of a file
    SPFS_SEEK_CUR: seek from the present file pointer As the output of the seek function, "0" is returned for a normal termination and "−1" is returned when an error occurs.

Additionally, the following functions may be used:

spfs_aread: asynchronous read function which does not wait for the termination of the input/output process;

spfs_awrite: asynchronous write function which does not wait for the termination of the input/output process; and spfs_await wait function for checking for the termination of the asynchronous input/output process.

A function for obtaining details on the type of error which occurs in the process is also available.

The specific configuration of the metafile will now be described below.

The parallel file (logical file) is comprised of a plurality of UNIX files. A metafile having the file name of the designated logical file identifies the location of the partition files which are the substance of the designated logical file.

The following is an example of the metafile, which indicates that the number of stripes and the stripe width of a file "mytest" are 2 and 16K bytes, respectively, and that a logical file corresponds to two partition files on two nodes "apnet0002" and "apnet0003".

{cnet0000:11} cat mytest
    spfsfile 2 16384 apnet0002/export/test/work1124000 0000024281981800100000000000 apnet0003/export/test/work 2124000000003428198180020000000000

I/O nodes for creating the partition files are designated in the configuration file (config file). The following is an example of the configuration file, which indicates that two I/O nodes "apnet0002" and "apnet0003" are prepared for the partition files. When the partition files are created, prefix pass names designated in this example are added to the file names.

{cnet0000:11} cat config
    apnet0002 /export/test/work1
    apnet0003 /export/test/work2

FIG. 16 shows a configuration of a second embodiment of a parallel computer system according to the present invention. The constituents in FIG. 16 with the same reference numerals as those in FIG. 1 have the same functions as the constituents in FIG. 1, and the detailed explanation is omitted.

This parallel computer system comprises; calculation nodes (data processing nodes or computing nodes) 1*a*, and 1*b*, each including a CPU and a main memory or storage device; a network file system 2 for providing a file access function common to the calculation nodes 1*a* and 1*b*; secondary storage devices 61 and 62 connected to the calculation nodes 1*a* and 1*b*, respectively; and a network 4 to which the calculation nodes 1*a* and 1*b* are connected. The network file system 2 comprises a metafile 21 indicating a logical file 51 which is processed in common on the calculation nodes 1*a* and 1*b*, and a configuration file 22 including a list of nodes, which includes the names of the calculation nodes 1*a* and 1*b* corresponding to the secondary storage devices 61 and 62 holding actual data of the logical file 51.

The calculation nodes 1*a* and 1*b* of this embodiment function as both the calculation nodes and the I/O nodes in the first embodiment. The partition files 52*a*–54*a* and 52*b*–54*b*, which correspond to the logical file 51 used in an application program performed on the calculation nodes 1*a* and 1*b*, are held in the secondary storage devices 61 and 62 connected to the calculation nodes 1*a* and 1*b*, respectively.

Figure 17:
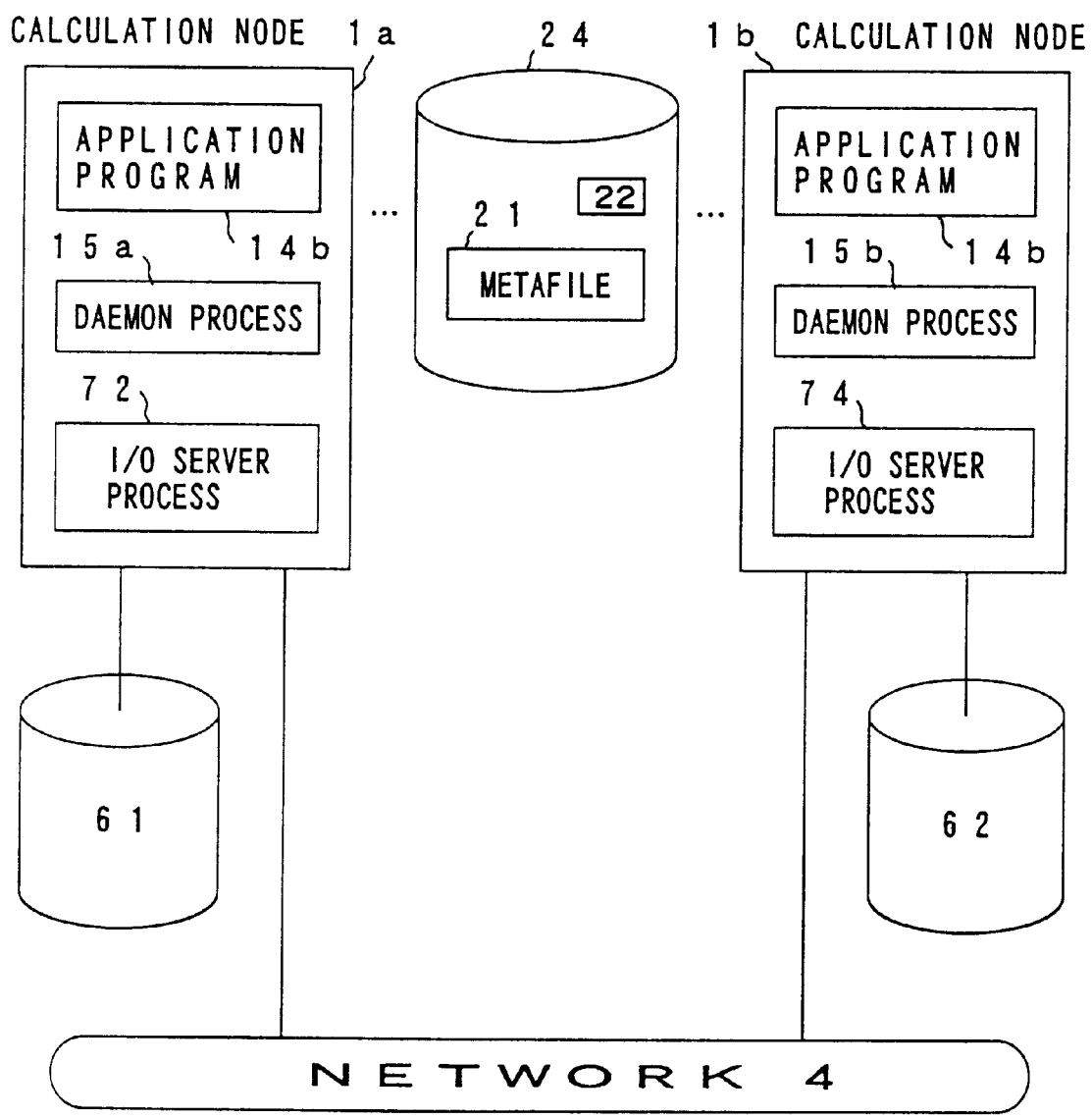
FIG. 17 shows a process configuration of the second embodiment of the parallel computer system according to the present invention.

FIG. 17 shows a process configuration of the second embodiment. The same reference numerals indicate the same functions of the constituents in FIG. 13 and FIG. 17.

In this embodiment, the application programs 14*a* and 14*b* are executed by the calculation nodes 1*a* and 1*b*, and the file output/input process requested by the application program is performed by calculation nodes 1*a* and 1*b*. The calculation nodes 1*a* and 1*b* share the secondary storage device 24 in which the metafile 21 is stored.

Daemon processes 15*a* and 15*b* include the functions of the daemon processes 13*a* and 71 and the daemon processes 13*b* and 73, respectively. The I/O sever processes 72 and 74 are started in the calculation nodes 1*a* and 1*b* when the read/write process is performed.

The file open process, which is included in the application program in a calculation node according to the second embodiment, will be described below. This process corresponds to the flowchart shown in FIG. 14.

When the open operation of the parallel file is started, synchronization with the other processes which are concurrently opened is set in step S1. Next, the calculation node reads the configuration file 22 to obtain information about the nodes for the input/output of data and the file prefix, in step S2. Then, a determination whether the node is a master or slave node is made in step S3.

If the node is determined as the master node (Master in step S3), whether or not a metafile 21 corresponding to the designated name (logical file name) already exists is checked, and information about the partition files is read from the metafile 21, in step S4, if the designated name exists. If the metafile of the designated name does not exist and a creation of the metafile is requested by the command "create", a new metafile 21 is made and information about the partition files are prepared in the new metafile 21, in step S5.

In step S6, communication is made with the calculation nodes determined based on the configuration file 22. Here, if "create" is designated, partition files are created in the secondary storage devices. If the partition files still exist, all of the partition files are opened. After that, information indicating that the partition files have been opened is notified to the slave process in the slave node, in step S7. The slave node, which is determined in step S3 (Slave in step S3), receives the information from the master process in the master node, in step S8.

Next, the write process, which also is included in the application program, on the calculation node of the parallel file, will be described. This process corresponds to the flowchart shown in FIG. 15.

The calculation node determines which partition file fits the data requested to be written according to the file offset and data length for writing requested by the user, and creates an I/O request list for the corresponding partition files, in step S11. Next, the data in a user's buffer are copied to a transmission buffer managed by the network file system 2 for each partition file, in step 12. After that, a write request is sent to each node on which the corresponding partition file exists, in step S13. If a plurality of nodes are designated, the write request is sent to all of the plurality of nodes, in steps S13 and S14.

Next, the calculation node receives the result of the writing from each node, in step S15. If the write request is sent to a plurality of nodes, the calculation node receives the results from all of the plurality of nodes, in steps S15 and S16. The write process is terminated after receiving all the results.

Figure 18:
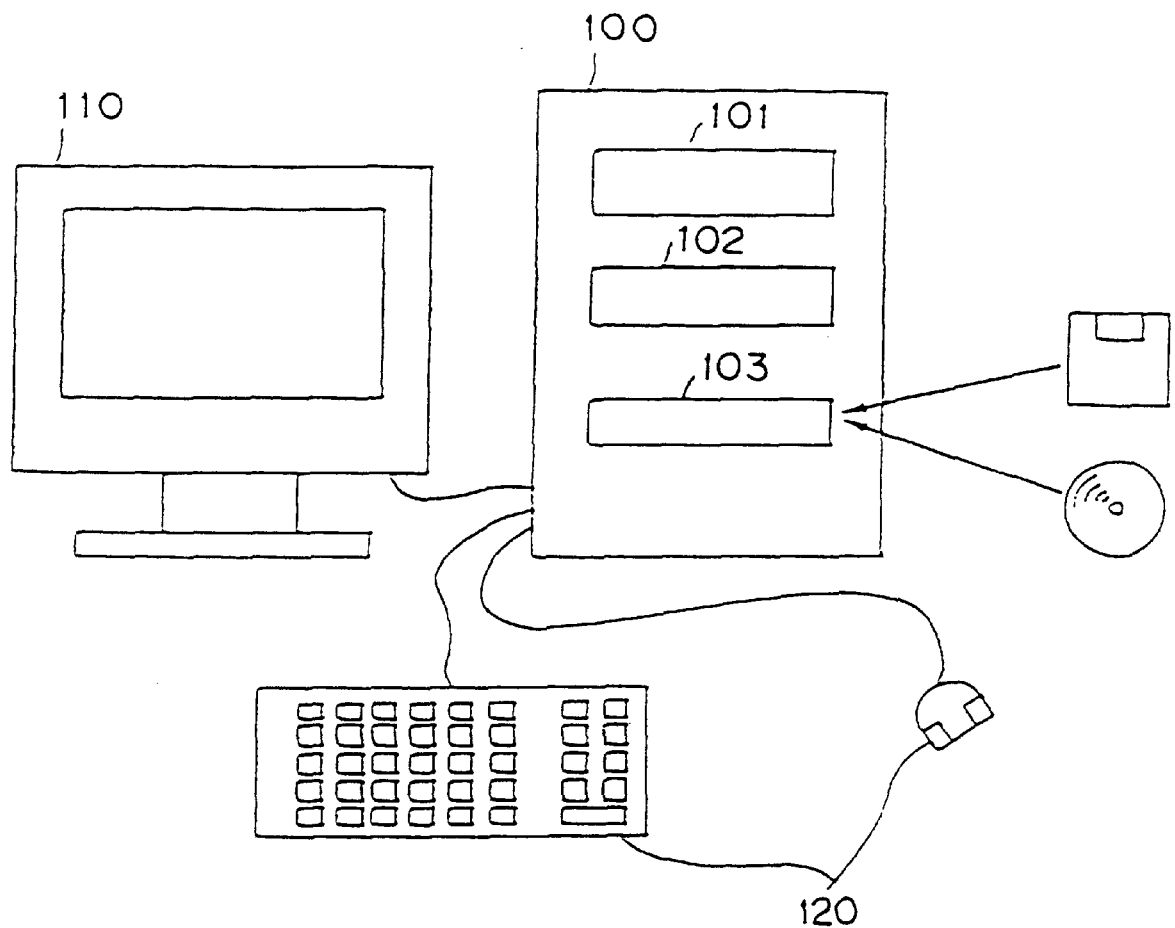
FIG. 18 shows a computer system for executing a computer program for performing the file processing method according to the invention.

FIG. 18 shows a computer system for executing a computer program for performing the above described process according to the invention, which may be stored in a storage medium.

This computer system comprises a computer 100, a display 110, and an entry device 120 including a keyboard and a mouse. The computer 100 comprises a processor 101, a memory 102, and a driver 103 for the storage medium, and may be correspond to the above described calculation node or the storage devices in the parallel computer system according to the invention.

The processor 101 performs the above-described processes using a computer program, and the memory 102 holds the computer program, data, and files necessary for executing the computer program. The driver 103 is used for exchanging data between the computer 100 and an external storage medium, and a program stored in an external storage medium is executed through the driver 103. The user inputs information necessary to execute the program through the entry device 120.

When the storage medium is realized by an external storage medium, it is implemented by an optical medium, a magnetic medium, and a magneto-optic medium, and may include a floppy disk, a hard disk, a CD-ROM, MD or the like. Further, the storage medium may be implemented by an internal storage medium such as a hard disk, ROM, RAM, or the like.

According to the invention, a massive volume of data stored in the storage devices can be processed through a network simultaneously at high speed, and a data input/output time for a parallel application program can be shortened, thereby improving the whole parallel computer system performance.

What is claimed is:

1. A parallel computer system in which a plurality of nodes are connected through a network, comprising:

a calculation node connected to the network;

a plurality of storage devices to store, as partition files, divided data which correspond to a logical file on said calculation node;

a plurality of I/O nodes corresponding to said plurality of storage devices, respectively, and connected between the network and said plurality of storage devices, respectively; and network file means for relating said logical file with said partition files separately stored among said plurality of storage devices, wherein said calculation node performs an intermediation process under root authority, said plurality of I/O nodes perform daemon processes under root authority, and a user process on said calculation node starts a server process on said plurality of I/O nodes through said intermediation process and said daemon processes so as to access said partition files in said plurality of storage devices.

2. The parallel computer system according to claim 1, wherein said network file means includes a metafile indicating a relationship between said logical file and said partition files separately stored among said plurality of storage devices, and said calculation node accesses said partition files by referring to said metafile for processing said logical file.

3. The parallel computer system according to claim 2, further comprising a secondary storage device holding said metafile, accessible from all calculation nodes connected to the network.

4. The parallel computer system according to claim 2, wherein said metafile comprises a field indicating a number of partitions of said partition files separately stored among said plurality of storage devices.

5. The parallel computer system according to claim 2, wherein said metafile comprises a field indicating a data length of said partition files separately stored among said plurality of storage devices.

6. The parallel computer system according to claim 1, wherein said network file means comprises a configuration file indicating a list of said plurality of I/O nodes.

7. The parallel computer system according to claim 6, wherein said calculation node selects I/O nodes corresponding to storage devices to which data corresponding to said logical file are to be stored from said list of said plurality of I/O nodes.

8. The parallel computer system according to claim 1, wherein said calculation node decides a file name including at least one of a site ID, process ID, time information, and sequence information of said calculation node, as a name of said partitioned files.

9. The parallel computer system according to claim 1, wherein said calculation node selects one of two processes of processing a parallel file of the logical file and processing a non-parallel file on a single node, based on a value of an environment variable.

10. The parallel computer system according to claim 1, further comprising a second calculation node connected to the network, wherein when said calculation node and said second calculation node open a same logical file, only said calculation node communicates with said plurality of storage devices and said second calculation node processes a logical file according to information from said calculation node.

11. The parallel computer system according to claim 1, wherein said calculation node performs a monitoring daemon process under root authority, and when an abnormal termination of a user process arises in an operation of said logical file, the abnormal termination is detected in said monitoring daemon process, cancellation of data input/output is requested to daemon processes on I/O nodes corresponding to said plurality of storage devices, and server processes for data input/output are forcefully terminated by said daemon process.

12. A parallel computer system in which a plurality of nodes are connected through a network, comprising:

a calculation node connected to the network;

a plurality of storage devices to store as partition files, divided data which correspond to a logical file on said calculation node; and network file means for relating said logical file with said partition files separately stored among said plurality of storage devices, wherein said calculation node performs an intermediation process under root authority, a plurality of I/O nodes corresponding to said plurality of storage devices perform daemon processes under root authority, and a user process on said calculation node starts a server processes on said plurality of I/O nodes through said intermediation process and said daemon processes so as to access said partition files in said plurality of storage devices.

13. A file processing method in a parallel computer system comprising a plurality of nodes connected through a network, comprising the steps of:

storing divided data, which correspond to a logical file processed in a calculation node connected to the network, in a plurality of storage device as partition files;

preparing a metafile for relating said logical file with said partition files separately stored among said plurality of storage devices;

performing an intermediation process under root authority on said calculation node;

performing daemon processes under root authority on a plurality of I/O nodes corresponding to said plurality of storage devices; and starting, by a user process on said calculation node, a server processes on said plurality of I/O nodes through said intermediation process and said daemon processes so as to access said partition files in said plurality of storage devices.

14. A storage medium readable by a computer holding a program executable by the computer to perform a file processing method for a parallel computer comprising a plurality of nodes connected through a network, said file processing method comprising the steps of:

storing divided data, which correspond to a logical file processed in a calculation node connected to the network, in a plurality of storage device as partition files;

preparing a metafile for relating said logical file with said partition files separately stored among said plurality of storage devices;

performing an intermediation process under root authority on said calculation node;

performing daemon processes under root authority on a plurality of I/O nodes corresponding to said plurality of storage devices; and starting, by a user process on said calculation node, a server processes on said plurality of I/O nodes through said intermediation process and said daemon processes so as to access said partition files in said plurality of storage devices.

15. A file processing method in a parallel computer system comprising a plurality of nodes connected through a network, comprising the steps of:

preparing a list of a plurality of I/O nodes respectively connected between the network and a plurality of storage devices to which data corresponding to a logical file processed by a calculation node are to be stored;

storing divided data, which correspond to a logical file processed in the calculation node connected to the network, in the plurality of storage device as partition files;

preparing a metafile for relating said logical file with said partition files separately stored among said plurality of storage devices;

performing an intermediation process under root authority on said calculation node;

performing daemon processes under root authority on said plurality of I/O nodes; and starting, by a user process on said calculation node, a server process on said plurality of I/O nodes through said intermediation process and said daemon processes so as to access said partition files in said plurality of storage devices.

16. The file processing method according to claim 15, further comprising the step of reading data corresponding to said logical file from said plurality of storage devices by referring to said metafile when said calculation node processes said logical file.

17. The file processing method according to claim 15, further comprising the step of writing in said metafile a number of partitions of said partition files separately stored among said plurality of storage devices.

18. The file processing method according to claim 15, further comprising the step of writing in said metafile a data length of said partition files separately stored among said plurality of storage devices.

19. The file processing method according to claim 15, further comprising the step of selecting I/O nodes which correspond to storage devices to which data corresponding to said logical file are to be stored, from said list when said calculation node prepares said logic file.

20. The file processing method according to claim 15, further comprising the steps of:

determining a file name including at least one of a site ID, process ID, time information, and sequence information of said calculation node, as a name of said partitioned files when said calculation node prepares said logic file; and writing said file name in said metafile.

21. The file processing method according to claim 15, further comprising the step of selecting one of two processes of processing a parallel file of the logical file and processing a non-parallel file on a single node, based on a value of an environment variable.

22. The file processing method according to claim 15, wherein
when said calculation node and a second calculation node open said logical file, said second calculation node processes said logical file according to information from said calculation node.

23. The file processing method according to claim 15, further comprising the steps of:
detecting an abnormal termination of a user process in an operation of said logical file by a monitoring daemon process; and
requesting a cancellation of data input/output to I/O nodes corresponding to said plurality of storage devices.

24. A storage medium readable by a computer holding a program executable by the computer to perform a file processing method for a parallel computer comprising a plurality of nodes connected through a network, said file processing method comprising the steps of:
preparing a list of a plurality of I/O nodes respectively connected between the network and a plurality of storage devices to which data corresponding to a logical file processed by a calculation node are to be stored
storing divided data, which correspond to a logical file processed in the calculation node connected to the network, in the plurality of storage device as partition files;
preparing a metafile for relating said logical file with said partition files separately stored among said plurality of storage devices;
performing an intermediation process under root authority on said calculation node;
performing daemon processes under root authority on said plurality of I/O nodes; and
starting, by a user process on said calculation node, a server process on said plurality of I/O nodes through said intermediation process and said daemon processes so as to access said partition files in said plurality of storage devices.

25. The storage medium according to claim 24, wherein
said file processing method further comprises the step of reading data corresponding to said logical file from said plurality of storage devices by referring to said metafile when said calculation node processes said logical file.

26. The storage medium according to claim 24, wherein
said file processing method further comprises the step of writing in said metafile a number of partitions of said partition files separately stored among said plurality of storage devices.

27. The storage medium according to claim 24, wherein
said file processing method further comprises the step of writing in said metafile a data length of said partition files separately stored among said plurality of storage devices.

28. The storage medium according to claim 24, wherein
said file processing method further comprises the step of selecting I/O nodes which correspond to storage devices to which data corresponding to said logical file are to be stored, from said list when said calculation node prepares said logical file.

29. The storage medium according to claim 24, wherein
said file processing method further comprises the steps of:
determining a file name including at least one of a site ID, process ID, time information, and sequence information of said calculation node, as a name of said partitioned files when said calculation node prepares said logic file; and
writing said file name in said metafile.

30. The storage medium according to claim 24, wherein
said file processing method further comprises the step of selecting one of two processes of processing a parallel file of the logical file and processing a non-parallel file on a single node, based on a value of an environment variable.

31. The storage medium according to claim 24, wherein, in said file processing method, when said calculation node and a second calculation node open said logical file, said second calculation node processes said logical file according to information from said calculation node.

32. The storage medium according to claim 24, wherein
said file processing method further comprises the steps of:
detecting an abnormal termination of a user process in an operation of said logical file by a monitoring daemon process; and
requesting a cancellation of data input/output to I/O nodes corresponding to said plurality of storage devices.

* * * * *